(12) United States Patent
Cheng et al.

(10) Patent No.: US 12,273,013 B2
(45) Date of Patent: Apr. 8, 2025

(54) EXCHANGEABLE IN-PIPE POWER GENERATING DEVICE

(71) Applicants: Cheng-Yuan Cheng, Taichung (TW); Yi-Ji Lin, Changhua County (TW)

(72) Inventors: Cheng-Yuan Cheng, Taichung (TW); Yi-Ji Lin, Changhua County (TW)

(73) Assignees: Cheng-Yuan Cheng, Taichung (TW); Yi-Ji Lin, Taichung (TW); Hung-Chun Peng, Taoyuan (TW)

( * ) Notice: Subject to any disclaimer, the term of this patent is extended or adjusted under 35 U.S.C. 154(b) by 0 days.

(21) Appl. No.: 18/479,291

(22) Filed: Oct. 2, 2023

(65) Prior Publication Data

US 2024/0380277 A1    Nov. 14, 2024

(30) Foreign Application Priority Data

May 12, 2023 (TW) .................................. 112117813

(51) Int. Cl.
*H02K 7/18* (2006.01)
(52) U.S. Cl.
CPC .................................. *H02K 7/1823* (2013.01)
(58) Field of Classification Search
CPC .................................................... H02K 7/1823
See application file for complete search history.

(56) References Cited

FOREIGN PATENT DOCUMENTS

| CN | 115711319 | 2/2023 | |
|---|---|---|---|
| WO | WO 2018117380 | 6/2018 | |
| WO | WO-2018117380 A1 * | 6/2018 | .............. F03B 15/02 |

OTHER PUBLICATIONS

English Translation of WO-2018117380-A1 (Year: 2018).*
Taiwanese Search Report in counterpart Appln No. 112117813, mailed on Oct. 13, 2023, 2 pages (with English translation).

* cited by examiner

*Primary Examiner* — Sean Gugger
(74) *Attorney, Agent, or Firm* — Fish & Richardson P.C.

(57) ABSTRACT

An exchangeable in-pipe power generating device includes a pipe unit, a base unit, and a power generating unit. The pipe unit includes a pipe body extending along a pipe axial direction, and an opening disposed on the pipe body and extending along the pipe axial direction. The base unit includes a first base portion extending along the pipe axial direction, disposed in the pipe body, and adjacent to the opening. The power generating unit includes a plurality of power generators disposed on the first base portion and spaced apart from one another along the pipe axial direction. Each of the power generators includes a blade module rotatable about a blade axis, and a power converting module driven by the blade module to convert kinetic energy into electrical energy. The blade axis of each of the power generators cooperates with the pipe axial direction to form an acute angle.

6 Claims, 5 Drawing Sheets

EXCHANGEABLE IN-PIPE POWER GENERATING DEVICE

CROSS-REFERENCE TO RELATED APPLICATION

This application claims priority to Taiwanese Invention Patent Application No. 112117813, filed on May 12, 2023, and incorporated by reference herein in its entirety.

FIELD

The disclosure relates to an in-pipe power generating device, and more particularly to an exchangeable in-pipe power generating device.

BACKGROUND

A conventional in-pipe power generator includes a pipe, a rotor that is disposed in the pipe, and a stator that surrounds the pipe. The rotor includes a plurality of blades that are disposed in the pipe and that surrounds an axis of the pipe, and a plurality of magnets that are respectively disposed on the blades and that are proximate to an inner surface of the pipe. When water in the pipe flows through the blades and drives the blades to rotate, the stator is subjected to magnetic field of the magnets and generates an inducted current, thereby generating power.

Although the conventional in-pipe power generator generates power, water flow in the pipe is affected by the rotor that occupies a large portion of a cross section of the pipe such that water flow is reduced. Furthermore, when the conventional in-pipe power generator fails, the entire in-pipe power generator has to be removed for repair, which is very inconvenient.

SUMMARY

Therefore, an object of the disclosure is to provide an exchangeable in-pipe power generating device that can alleviate at least one of the drawbacks of the prior art.

According to the disclosure, the exchangeable in-pipe power generating device includes a pipe unit, a base unit, and a power generating unit.

The pipe unit includes a pipe body that extends along a pipe axial direction, and an opening that is disposed on the pipe body and that extends along the pipe axial direction.

The base unit includes a first base portion that extends along the pipe axial direction and that is disposed in the pipe body. The first base portion is adjacent to the opening.

The power generating unit includes a plurality of power generators that are disposed on the first base portion and that are spaced apart from one another along the pipe axial direction. Each of the power generators includes a blade module that is rotatable about a blade axis, and a power converting module that is disposed on the first base portion and that is driven by the blade module to convert kinetic energy into electrical energy. The blade axis of each of the power generators cooperates with the pipe axial direction to form an acute angle.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
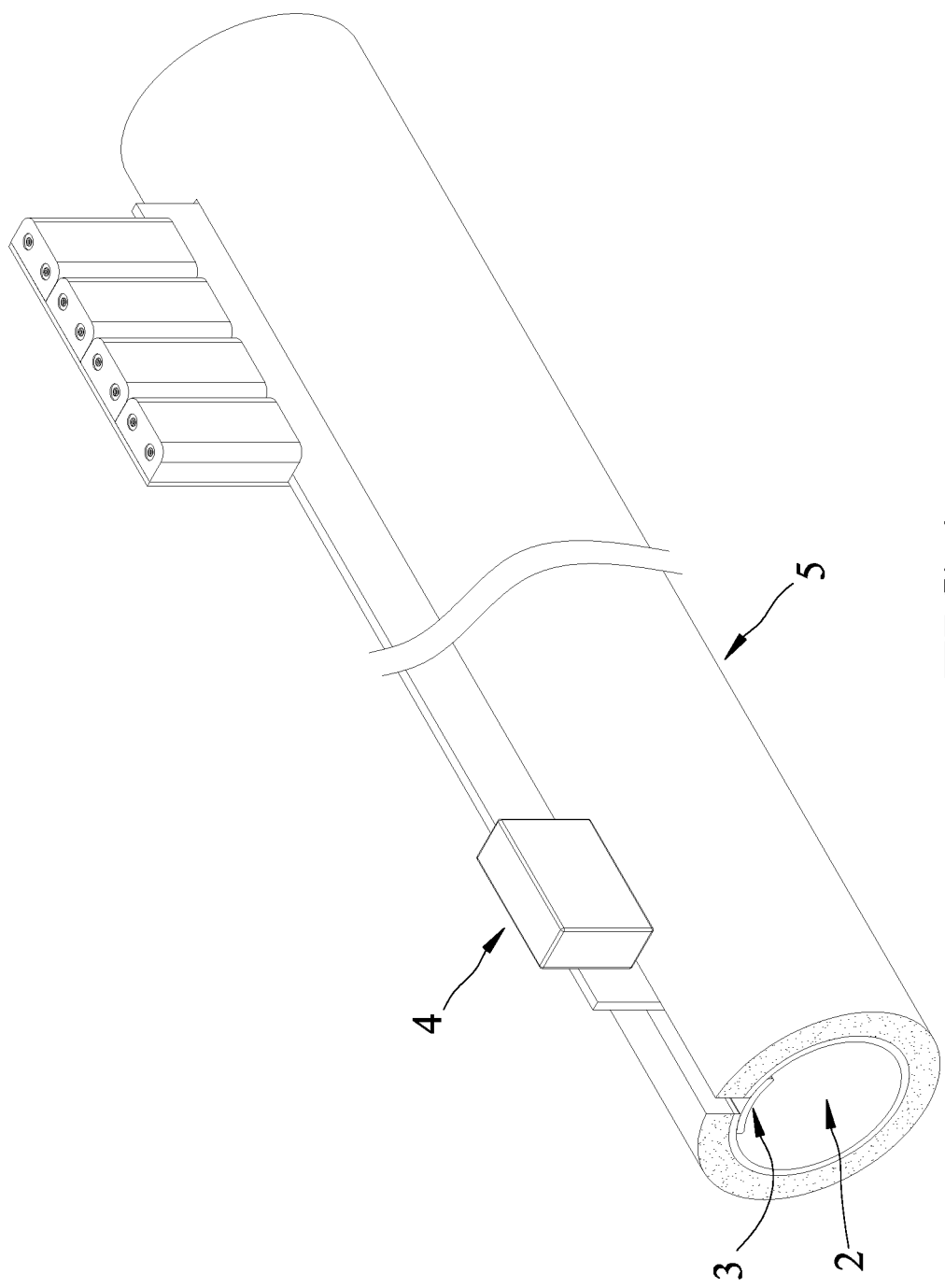
FIG. 1 is a perspective view of an exchangeable in-pipe power generating device according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
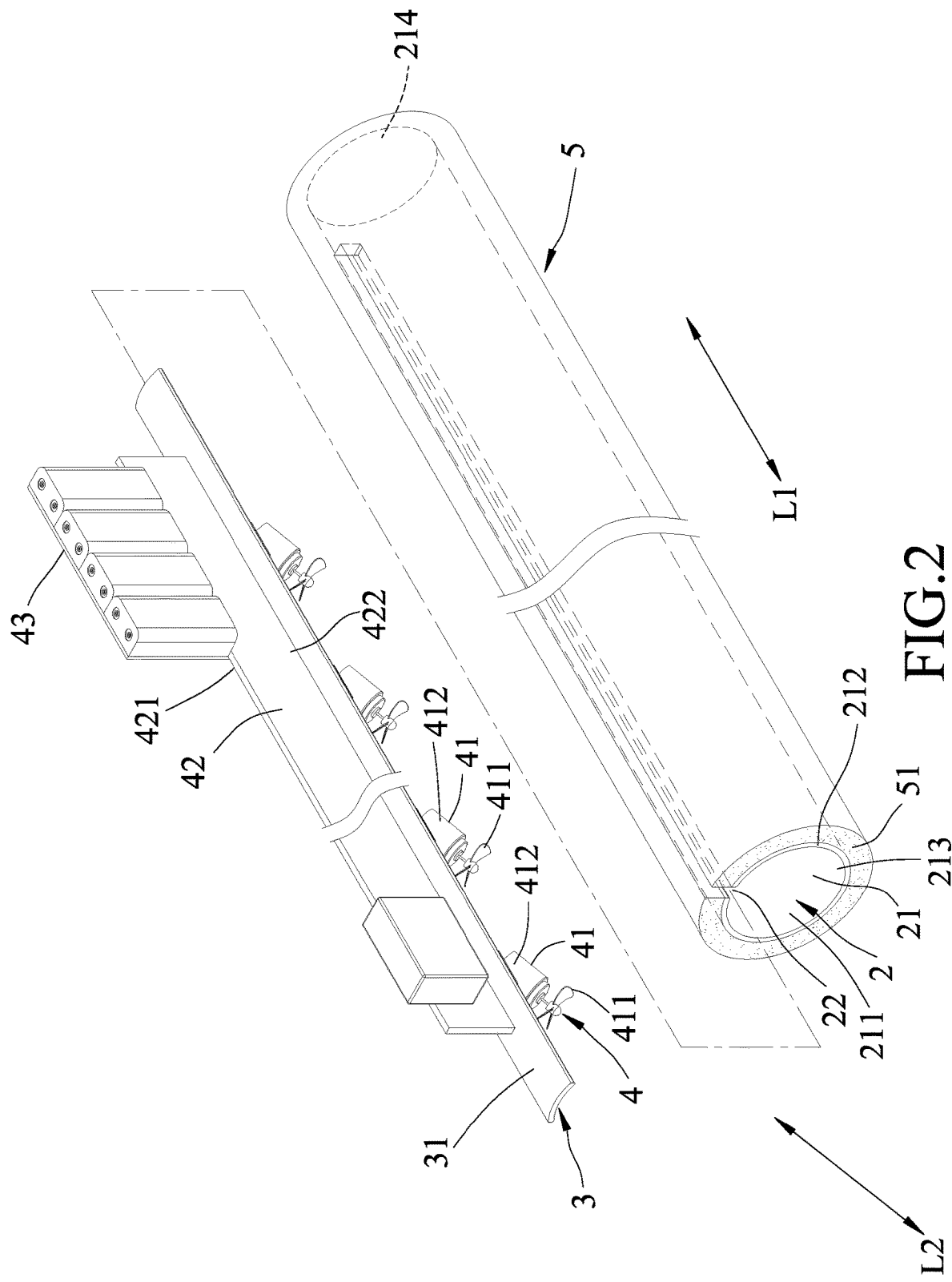
FIG. 2 is an exploded view of the first embodiment.
Figure 3:
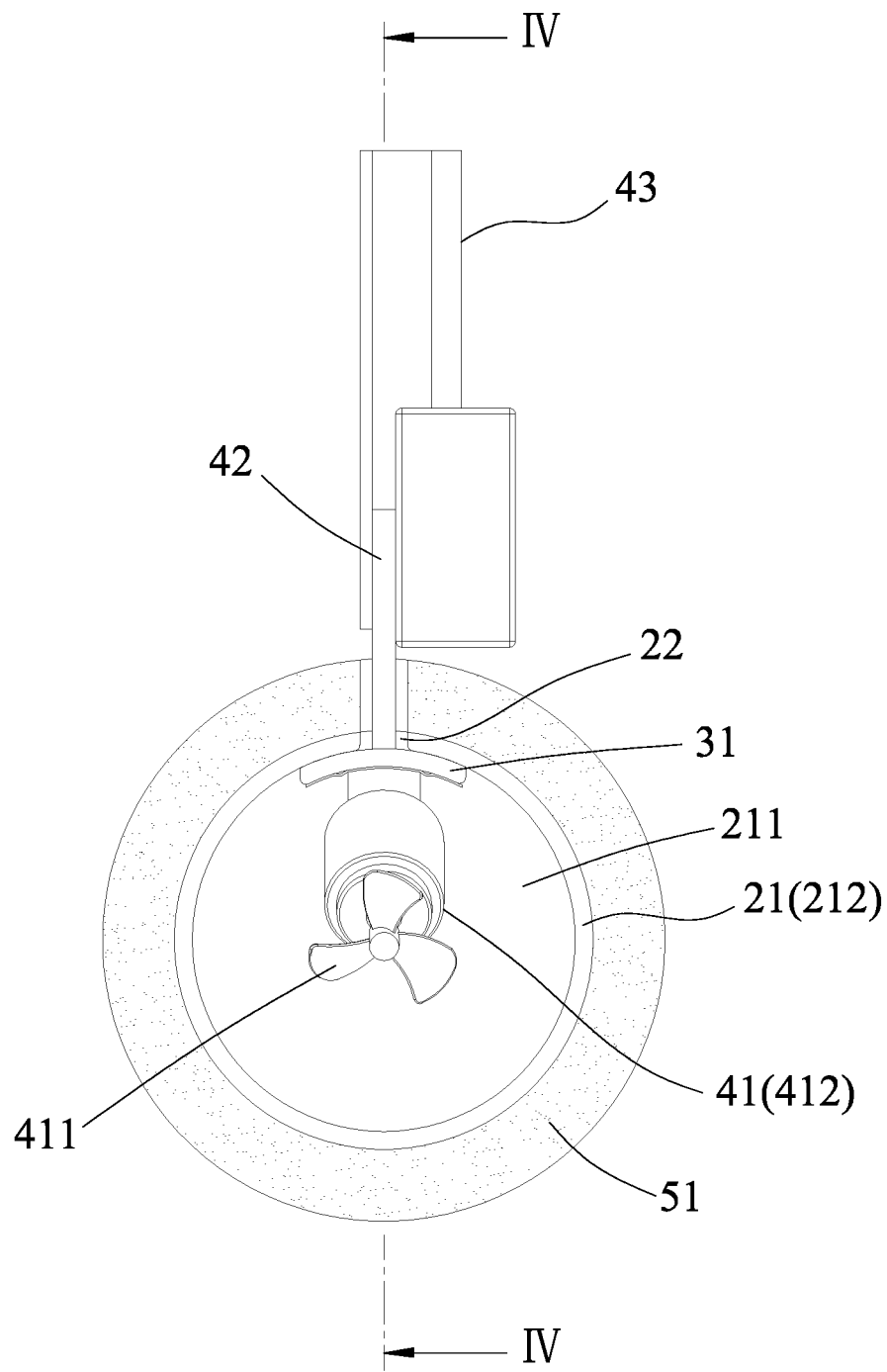
FIG. 3 is a side view of the first embodiment.

Referring to FIGS. 1, 2 and 3, the first embodiment of an exchangeable in-pipe power generating device according to the disclosure includes a pipe unit 2, a base unit 3, a power generating unit 4, and a protecting unit 5.

Figure 4:
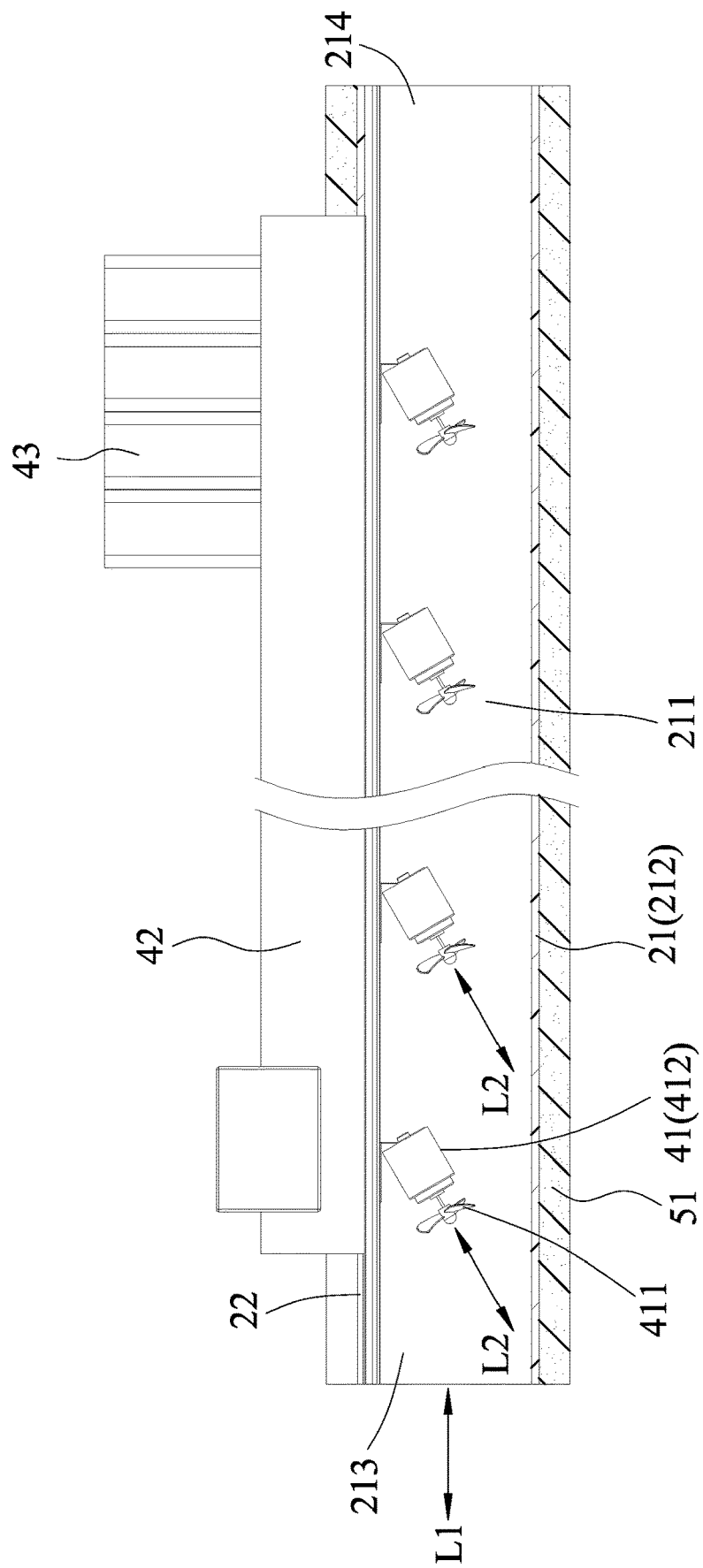
FIG. 4 is a sectional view taken along line IV-IV in FIG. 3.

Referring to FIGS. 2, 3 and 4, the pipe unit 2 includes a pipe body 21 that extends along a pipe axial direction (L1), and an opening 22 that is disposed on the pipe body 21 and that extends along the pipe axial direction (L1). The pipe body 21 has a pipe wall 212 that defines a bore 211. The bore 211 has an inlet end 213, and an outlet end 214 that is opposite to the inlet end 213 along the pipe axial direction (L1). In this embodiment, the opening 22 of the pipe unit 2 is disposed at top of the pipe body 21 and extends through the pipe wall 212, such that, after water flows through the pipe body 21, limescale will not be deposited at the opening 22.

The base unit 3 includes a first base portion 31 that is disposed in the bore 211 of the pipe body 21 and that extends along the pipe axial direction (L1). The first base portion 31 is adjacent to the opening 22 of the pipe unit 2.

The power generating unit 4 includes a plurality of power generators 41 that are disposed in the bore 211 of the pipe body 21, that are spaced apart from one another along the pipe axial direction (L1), and that are disposed on and connected to the first base portion 31 of the base unit 3, a circuit board 42 that is connected to the first base portion 31 and that is electrically coupled to the power generators 41, and a power storage member 43 that is electrically coupled to the circuit board 42.

Each of the power generators 41 is disposed along a blade axis (L2), and includes a blade module 411 that is rotatable about the blade axis (L2), and a power converting module 412 that is disposed on the first base portion 31 and that is driven by the blade module 411 to convert kinetic energy into electrical energy. The blade axis (L2) of each of the power generators 41 is inclined relative to the pipe axial direction (L1), and is gradually inclined upwardly toward the opening 22 when extending from the inlet end 213 toward the outlet end 214 (as shown in FIG. 4). The blade axis (L2) of each of the power generators 41 cooperates with the pipe axial direction (L1) to form an acute angle. It should be noted that, since the power generation technology utilizing the blade module 411 to drive the power converting module 412 to generate electrical energy is a common technology known to those skilled in the art and is not a main technical feature of the disclosure, further description is omitted.

The circuit board 42 is electrically coupled to the power converting module 412 of each of the power generators 41, and has an outer portion 421 that is distal from the opening 22, and an inner portion 422 that is opposite to the outer portion 421 and that is proximate to the opening 22. In this embodiment, the inner portion 422 of the circuit board 42 is connected to the first base portion 31 of the base unit 3.

The power storage member 43 is electrically coupled to the circuit board 42 for receiving the electrical energy converted by the power converting module 412 of each of the power generators 41. In this embodiment, the power storage member 43 is a plurality of storage batteries, but is not limited thereto, and the power storage member 43 may be other energy accumulating element(s). The power storage member 43 is located outside the opening 22 of the pipe unit 2.

The protecting unit 5 includes a protective cover 51 that surrounds the pipe body 21, that is adjacent to the circuit board 42, and that allows the circuit board 42 to extend therethrough. In this embodiment, the protective cover 51 is made of a foamed plastic.

When water flows through the bore 211 of the pipe body 21 from the inlet end 213 toward the outlet end 214, the blade modules 411 respectively of the power generators 41 are sequentially driven to rotate, such that electrical energy is generated by the power converting modules 412 respectively of the power generators 41 and is stored in the power storage member 43 via the circuit board 42.

Since the blade axis (L2) of each of the power generators 41 forms the acute angle with the pipe axial direction (L1), the blade module 411 of each of the power generators 41 does not occupy a large portion of a cross section of the pipe body 21, and water may flow smoothly when flowing through the bore 211 of the pipe body 21.

When repair or maintenance (e.g., limescale cleaning) is required, the power generating unit 4 may be easily removed as long as the base unit 3 is removed from the opening 22 of the pipe unit 2 by moving along the pipe axial direction (L1). Therefore, compared to the conventional in-pipe power generator, the exchangeable in-pipe power generating device of the disclosure is convenient for maintenance and repair.

Figure 5:
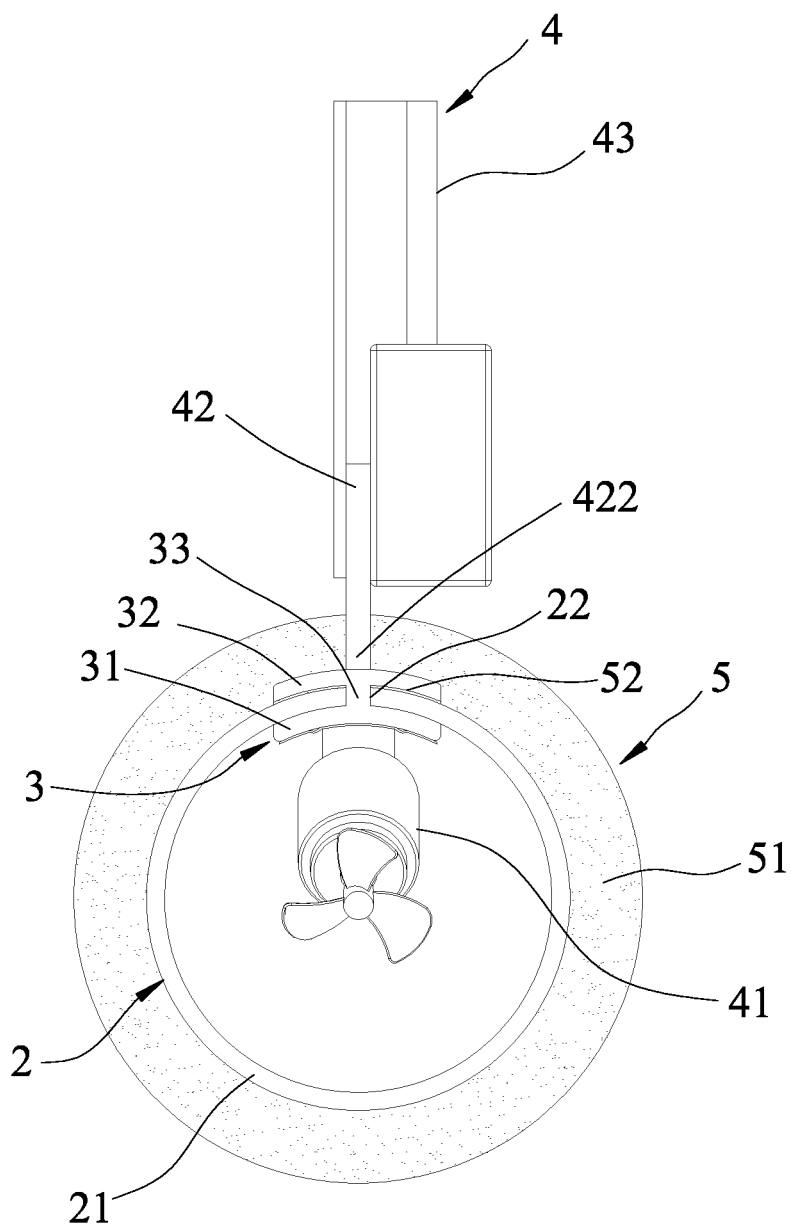
FIG. 5 is a side view of an exchangeable in-pipe power generating device according to a second embodiment of the disclosure.

Referring to FIG. 5, an exchangeable in-pipe power generating device according to a second embodiment of the disclosure has a structure generally identical to the exchangeable in-pipe power generating device of the first embodiment but differs in the base unit 3 and the protecting unit 5.

The base unit 3 further includes a second base portion 32 that is disposed outside the pipe body 21 and that is spaced apart from the first base portion 31, and a connecting portion 33 that extends through the opening 22 and that is connected between the first base portion 31 and the second base portion 32. In this embodiment, the inner portion 422 of the circuit board 42 is connected to the second base portion 32.

The protecting unit 5 further includes a waterproof adhesive 52 that is adhered between the second base portion 32 and the pipe body 21.

Thus, the second embodiment may also achieve the same objective and effect as the first embodiment.

In summary, since the power generating unit 4 is disposed on the base unit 3 which is removable from the opening 22 of the pipe unit 2, and each of the power generators 41 is disposed along the blade axis (L2) that forms the acute angle with the pipe axial direction (L1), water may flow smoothly during power generation, and the exchangeable in-pipe power generating device of the disclosure facilitates maintenance and repair, thereby achieving the objective of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An exchangeable in-pipe power generating device comprising:
   a pipe unit including a pipe body that extends along a pipe axial direction, and an opening that is disposed on said pipe body and that extends along the pipe axial direction;
   a base unit including a first base portion that extends along the pipe axial direction and that is disposed in said pipe body, said first base portion being adjacent to said opening; and
   a power generating unit including a plurality of power generators that is disposed on said first base portion and that is spaced apart from one another along the pipe axial direction, each of said power generators including a blade module that is rotatable about a blade axis, and a power converting module that is disposed on said first base portion and that is driven by said blade module to convert kinetic energy into electrical energy, the blade axis of each of said power generators cooperating with the pipe axial direction to form an acute angle;

wherein said opening of said pipe unit is disposed at top of said pipe body; and wherein said power generating unit further includes a circuit board that is connected to said base unit and that is electrically coupled to said power converting module of each of said power generators, said circuit board having an outer portion that is distal from said opening, and an inner portion that is opposite to said outer portion and that is proximate to said opening.

2. The exchangeable in-pipe power generating device as claimed in claim 1, wherein said power generating unit further includes a power storage member that is electrically coupled to said circuit board for receiving the electric energy converted by said power converting module of each of said power generators.

3. The exchangeable in-pipe power generating device as claimed in claim 2, further comprising a protecting unit, said protecting unit including a protective cover that surrounds said pipe body, that is adjacent to said circuit board and that allows said circuit board to extend therethrough.

4. The exchangeable in-pipe power generating device as claimed in claim 1, wherein said base unit further includes a second base portion that is disposed outside said pipe body and that is spaced apart from said first base portion, and a connecting portion that extends through said opening and that is connected between said first base portion and said second base portion.

5. The exchangeable in-pipe power generating device as claimed in claim 4, further comprising a protecting unit, said protecting unit including a protective cover that surrounds said pipe body, that is adjacent to said circuit board and that allows said circuit board to extend therethrough, and a waterproof adhesive that is adhered between said second base portion and said pipe body.

6. The exchangeable in-pipe power generating device as claimed in claim 1, wherein said pipe body of said pipe unit has a pipe wall defining a bore, said bore having an inlet end, and an outlet end opposite to said inlet end along the pipe axial direction, the blade axis of each of said power generators being inclined relative to the pipe axial direction and being gradually inclined upwardly toward said opening when extending from said inlet end toward said outlet end.

\* \* \* \* \*